(12) United States Patent
Anikanov et al.

(10) Patent No.: US 11,353,398 B2
(45) Date of Patent: Jun. 7, 2022

(54) SYSTEM, COMPUTING DEVICE, AND METHOD FOR EXTRACTION OF OPTICAL PROPERTIES OF TURBID MEDIUM BY USING DIFFUSE REFLECTOMETRY

(71) Applicant: SAMSUNG ELECTRONICS CO., LTD., Suwon-si (KR)

(72) Inventors: Alexey Grigorievich Anikanov, Moscow (RU); Tatiana Igorevna Kopysova, Perm (RU); Pavel Aleksandrovich Ivshin, Moscow region (RU); Alexey Dmitrievich Lantsov, Moscow region (RU); Vasily Victorovich Grigorev, Moscow (RU); Maxim Vladimirovich Ryabko, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/123,336

(22) Filed: Dec. 16, 2020

(65) Prior Publication Data

US 2021/0262932 A1     Aug. 26, 2021

(30) Foreign Application Priority Data

Feb. 20, 2020 (RU) .......................... RU2020107787
Oct. 16, 2020 (KR) ........................ 10-2020-0134631

(51) Int. Cl.
*G01N 21/47* (2006.01)
(52) U.S. Cl.
CPC ..................... *G01N 21/474* (2013.01); *G01N 2021/4769* (2013.01); *G01N 2201/067* (2013.01)

(58) Field of Classification Search
CPC ................. G01N 21/474; G01N 21/49; G01N 2201/067; G01N 2021/4769
See application file for complete search history.

(56) References Cited

U.S. PATENT DOCUMENTS

| 6,678,541 | B1 | 1/2004 | Durkin et al. |
| 8,301,216 | B2 | 10/2012 | Durkin et al. |
| 9,086,536 | B2 | 7/2015 | Pang et al. |
| 9,989,413 | B1 | 6/2018 | Ungnapatanin |
| 10,420,470 | B2 | 9/2019 | Kwon et al. |
| 2006/0176471 | A1* | 8/2006 | Hendriks ............... G01N 21/31 356/320 |

(Continued)

FOREIGN PATENT DOCUMENTS

KR     10-0446830 B1     9/2004

*Primary Examiner* — Sang H Nguyen
(74) *Attorney, Agent, or Firm* — Sughrue Mion, PLLC

(57) ABSTRACT

A system for extraction of optical properties of a turbid medium by using diffuse reflectometry may include at least one light source, an optical receiver, at least one separator, and at least one processor configured to control the optical receiver, while the radiation is provided to the turbid medium in the radiation input area of the at least one light source, to sequentially open each LC cell from the array of LC cells, and simultaneously receive radiation, passed through the sequentially opened LC cells and corresponding microlenses, by corresponding photodetectors from the array of photodetectors to obtain the distribution of radiation intensity; and extract the optical properties of the turbid medium based on the distribution of radiation intensity.

23 Claims, 6 Drawing Sheets

(56) References Cited

U.S. PATENT DOCUMENTS

| | | | |
|---|---|---|---|
| 2011/0124988 A1* | 5/2011 | Cuccia | A61B 5/0059 |
| | | | 600/310 |
| 2014/0016132 A1* | 1/2014 | Schmitz | G01N 33/4833 |
| | | | 356/337 |
| 2014/0128744 A1* | 5/2014 | Cuccia | A61B 5/0064 |
| | | | 600/476 |
| 2016/0123811 A1 | 5/2016 | Hegyi et al. | |
| 2017/0059482 A1 | 3/2017 | Kim et al. | |
| 2017/0146493 A1* | 5/2017 | Passmore | A61B 8/4494 |
| 2017/0224257 A1 | 8/2017 | Rogers | |
| 2018/0014737 A1 | 1/2018 | Paulussen et al. | |
| 2018/0357462 A1 | 12/2018 | Mackey et al. | |

* cited by examiner

SYSTEM, COMPUTING DEVICE, AND METHOD FOR EXTRACTION OF OPTICAL PROPERTIES OF TURBID MEDIUM BY USING DIFFUSE REFLECTOMETRY

CROSS-REFERENCE TO RELATED APPLICATION(S)

This application is based on and claims priority under 35 U.S.C. § 119 to Korean Patent Application No. 10-2020-0134631, filed on Oct. 16, 2020, in the Korean Intellectual Property Office, and to Russian Patent Application No. 2020107787, filed on Feb. 20, 2020, in the Russian Patent Office, the disclosures of which are incorporated by reference herein in their entireties.

BACKGROUND

1. Field

The present disclosure relates to a method for extraction of optical properties of a turbid medium without penetration and without destruction of the turbid medium. More specifically, this application discloses a system, a computing device, and a method for extraction of optical properties of a turbid medium by using diffuse reflectometry.

2. Description of Related Art

Turbid media such as, for example, biomaterial (e.g., blood, skin, or the like), wood, and pharmacological and other compositions, products and other materials, etc., have two main parameters that define their optical properties: scattering coefficient and absorption coefficient. For accurate extraction of optical properties of a turbid medium, it is important that the measurement of these coefficients is precise.

Most known non-invasive devices for extraction of optical properties of a turbid medium are based on spectrometry and measure this medium using only one response defined by the combination of scattering and absorption coefficients at a time. Thus, the accuracy of this response is reduced due to crosstalk, whereby the radiation, passed through the measured turbid medium and pertinent to a certain zone on the turbid medium surface, is simultaneously received by two or more adjacent photodetectors (receivers) from the array of photodetectors in the optical receiving system due to aberrations inherent in this optical receiving system. Thus, the signal-to-noise ratio (SNR) is significantly reduced even with crosstalk of 1%.

A known device may include a collimated or focused light source unit, an optical detector unit, which is formed of a one-dimensional (1D) or two-dimensional (2D) array of optical detectors, and a signal processing unit. The device may measure only one response at a time, and is susceptible to crosstalk on the photodetectors side, which significantly reduces SNR.

SUMMARY

To address the above technical problem and achieve a technical result, which includes improving the accuracy of extraction of optical properties of a turbid medium by excluding crosstalk on the photodetectors side, the following main aspects of the example embodiments disclosed in this application are proposed.

According to an aspect of an example embodiment, a system for extracting optical properties of a turbid medium by using diffuse reflectometry may include at least one light source configured to provide radiation to the turbid medium in a radiation input area of the at least one light source; an optical receiver configured to receive radiation, passed through the turbid medium, in a radiation receiving area of the optical receiver, and obtain a distribution of radiation intensity, wherein the optical receiver comprises an array of liquid crystal (LC) cells, an array of microlenses, and an array of photodetectors which are aligned so that each LC cell from the array of LC cells corresponds to a corresponding microlens from the array of microlenses and to a corresponding photodetector from the array of photodetectors; at least one separator configured to separate the radiation input area of the at least one light source from the radiation receiving area of the optical receiver, and prevent radiation, partially reflected from a surface of the turbid medium in the radiation input area of the at least one light source, from entering the radiation receiving area of the optical receiver; and at least one processor configured to control the optical receiver, while the radiation is provided to the turbid medium in the radiation input area of the at least one light source, to sequentially open each LC cell from the array of LC cells, and simultaneously receive radiation, passed through the sequentially opened LC cells and corresponding microlenses, by corresponding photodetectors from the array of photodetectors to obtain the distribution of radiation intensity; and extract the optical properties of the turbid medium based on the distribution of radiation intensity.

According to an aspect of an example embodiment, a user computing device for extraction of optical properties of a turbid medium may include at least one light source configured to provide radiation to the turbid medium in a radiation input area of the at least one light source; an optical receiver configured to receive radiation, passed through the turbid medium, in a radiation receiving area of the optical receiver to obtain a distribution of radiation intensity, wherein the optical receiver comprises an array of liquid crystal (LC) cells, an array of microlenses, and an array of photodetectors which are aligned so that each LC cell from the array of LC cells corresponds to a corresponding microlens from the array of microlenses and to a corresponding photodetector from the array of photodetectors; at least one separator configured to separate the radiation input area of the at least one light source from the radiation receiving area of the optical receiver, and configured to prevent radiation, partially reflected from a surface of the turbid medium in the radiation input area of the at least one light source, from entering the radiation receiving area of the optical receiver; a processor configured to control the optical receiver, while the radiation is provided to the turbid medium in the radiation input area of the at least one light source, to sequentially open each LC cell from the array of LC cells, and simultaneously detect radiation, passed through the sequentially opened LC cells, by corresponding photodetectors from the array of photodetectors to obtain the distribution of radiation intensity; and extract the optical properties of the turbid medium based on the obtained distribution of radiation intensity.

According to an aspect of an example embodiment, a method for extraction of optical properties of a turbid medium may include providing radiation to an illumination area on a surface of the turbid medium while simultaneously preventing radiation, partially reflected from the surface of the turbid medium surface in the illumination area, from entering a target area of an optical receiver comprising an array of LC cells, an array of microlenses, and an array of photodetectors which are aligned so that each LC cell from the array of LC cells corresponds to a corresponding microlens from the array of microlenses and to a corresponding photodetector from the array of photodetectors; sequentially opening each LC cell from the array of LC cells; detecting radiation, passed through the sequentially opened LC cells, by corresponding photodetectors from the array of photodetectors; obtaining a plurality of radiation intensity values which represents a distribution of radiation intensity; and determining the optical properties of the turbid medium based on the distribution of radiation intensity.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
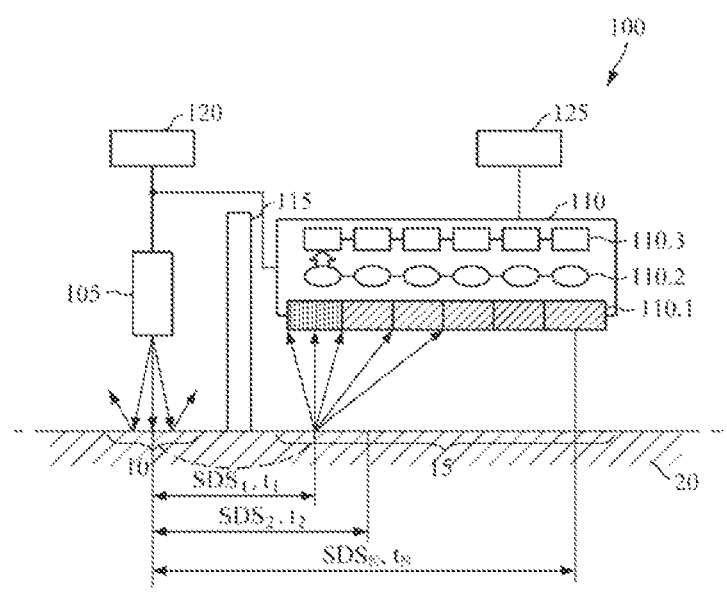
FIG. 1 illustrates a side view of an embodiment of a system 100 for extraction of optical properties of a turbid medium 20 by using diffuse reflectometry at the initial moment $t_1$ of operation time.
Figure 2:
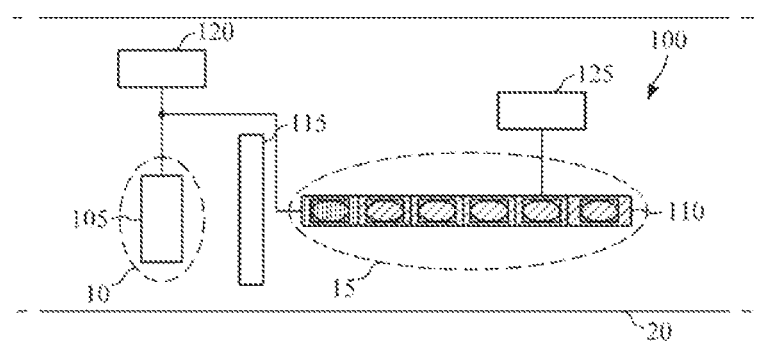
FIG. 2 illustrates a top view of the embodiment of the system 100 for extraction of optical properties of the turbid medium 20 by using diffuse reflectometry at the initial moment $t_1$ of operation time.

FIG. 1 illustrates a side view of an embodiment of a system 100 for extraction of optical properties of a turbid medium 20 by using diffuse reflectometry at the initial moment ($t_0$) of operation time. A top view of this embodiment of the system 100 for extraction of optical properties of the turbid medium 20 by using diffuse reflectometry at the initial moment ($t_0$) of operation is illustrated in FIG. 2. The turbid medium 20 is shown in FIGS. 1 and 2 as an example of the turbid medium, the optical properties of which are to be extracted using the system 100. It should be clear that the turbid medium 20 is not part of the system 100 itself. In addition, it should be understood that the orientation of the turbid medium 20 with respect to the components of the system 100 is not necessarily the same as that shown in FIGS. 1 and 2. The turbid medium 20 may be, but is not limited to, the media mentioned below, biomaterial (e.g., blood, skin, etc.), wood, pharmacological and other compositions, products, gas, or the like. If the system 100 is intended to be used for extraction of optical properties or analysis of a gaseous turbid medium 20, then the system 100 may further comprise a chamber made of transparent material (for example, glass), which is preliminarily pumped or otherwise filled with the gaseous turbid medium 20, the optical properties or analysis of which are to be determined.

The system 100 for extraction of optical properties of the turbid medium 20 by using diffuse reflectometry illustrated in FIGS. 1 and 2 comprises at least one light source 105 configured to provide radiation to the turbid medium 20 in a radiation input area 10. In an embodiment, the light source 105 is, but is not limited to, a coherent light source (e.g., a laser), light-emitting diode(s) (LEDs), a superluminescent diode(s) (SLD), a lamp (e.g., xenon) with a filter, or the like. Examples of lasers that can be used are distributed feedback lasers (DFBs), vertical-cavity surface-emitting lasers (VCSELs), etc. It should be understood that the radiation input area 10 is shown in FIGS. 1 and 2 schematically. The actual size and shape of the radiation input area 10 (i.e., the backlight spots on the turbid medium 20 surface) depend on the type, shape, and number of light sources 105, as well as on the distance from light sources 105 to the turbid medium 20 surface. When using a light source 105 without a transmitting optical system, the light source 105 is positioned as close as possible to the turbid medium 20 surface, otherwise the illumination spot on the turbid medium 20 surface becomes large, and the accuracy of restoration of optical properties decreases. The specific distance from the light source 105 to the turbid medium 20 surface can be empirically selected by taking into account the structural features of the housing of the system 100 and the position of the components of the system 100 in the housing.

The system 100 for extraction of optical properties of the turbid medium 20 by using diffuse reflectometry illustrated in FIGS. 1 and 2 comprises an optical receiver 110. The optical receiver 110 is configured to receive radiation passed through the turbid medium 20 in a radiation receiving area 15 to obtain a distribution of radiation intensity. It should be understood that the radiation receiving area 15 is shown in FIGS. 1 and 2 schematically. The actual size and shape of the radiation receiving area 15 (i.e., the target area on the turbid medium 20 surface) depends on the type, shape, and number of elements in the optical receiver 110. The specific distance from the turbid medium 20 surface to the optical receiver 110 may be empirically selected, by taking into account the structural features of the housing of the system 100 and the position of the components of the system 100 in the housing. In this case, the optical receiver 110 comprises an array 110.1 of liquid crystal (LC) cells, an array 110.2 of microlenses, and an array 110.3 of photodetectors, which are aligned so that each LC cell from the array 110.1 of LC cells corresponds to a corresponding microlens from the array of microlenses 110.2 and to a corresponding photodetector from the array 110.3 of photodetectors (e.g., as shown in FIG. 1). In an embodiment of the present disclosure, the array 110.1 of LC cells, the array 110.2 of microlenses, and the array 110.3 of photodetectors are aligned with each other in the order they are away from the turbid medium 20 and, optionally, can be mounted in the housing of the optical receiver 110, as shown in FIGS. 1 and 2.

According to the present disclosure, the array 110.1 of LC cells may comprise two or more LC cells arranged in at least one row, the array 110.2 of microlenses may comprise two or more microlens arranged in at least one row, and the array 110.3 of photodetectors may comprise two or more photodetectors arranged in at least one row. In the particular (illustrative) embodiment shown in FIGS. 1 and 2, the dimension of each of the array 110.1 of LC cells, the array 110.2 of microlenses, and the array 110.3 of photodetectors is 1×6 (six elements in each array, arranged in one row). One skilled in the art will appreciate that there can be other dimensions of said arrays, for example, 1×2, 2×6, 6×6, etc., and also that increasing the number of elements can increase the resolution of the optical receiver 110. In an embodiment, the array 110.1 of LC cells, the array 110.2 of microlenses, and the array 110.3 of photodetectors contain the same number of corresponding elements. However, there may be such an embodiment of the present disclosure in which the array 110.1 of LC cells, the array 110.2 of microlenses, the array 110.3 of photodetectors contain different number of corresponding elements, for example, the array 110.1 of LC cells contains one LC cell, the array 110.2 of microlenses contains one receiver.

The system 100 for extraction of optical properties of the turbid medium 20 by using diffuse reflectometry illustrated in FIGS. 1 and 2 comprises at least one separator 115 configured to separate the radiation input area 10 from the radiation receiving area 15, and configured to prevent the radiation, partially reflected from the turbid medium 20 surface in the radiation input area 10, from entering the radiation receiving area 15 of the optical receiver 110. In an embodiment, the optical receiver 110 is positioned relative to the at least one light source 105 and the at least one separator 115 so that the source-detector separation (SDS) distance is increased between the at least one light source 105 and each subsequent photodetector in at least one row of photodetectors, as illustrated in FIG. 1. In this way, it is possible to analyze different areas of the turbid medium 20. In the design of system 100, the at least one light source 105 and the optical receiver 110 are arranged relative to each other so that the radiation input area 10 and the radiation receiving area 15 do not overlap as shown, for example, in FIG. 1.

The system 100 for extraction of optical properties of the turbid medium 20 by using diffuse reflectometry illustrated in FIGS. 1 and 2 comprises a processor 120 configured to control the optical receiver 110, while the radiation is provided to the turbid medium 20 in the radiation input area 10, to induce the optical receiver 110 to sequentially open each LC cell from the array 110.1 of LC cells and simultaneously receive the radiation, passed through the corresponding opened LC cell and the microlens, by the corresponding photodetector from the array 110.3 of photodetectors to obtain a distribution of radiation intensity. When each LC cell from the array 110.1 of LC cells is opened sequentially, the processor 120 is configured to control the optical receiver 110 to induce the optical receiver 110 to sequentially open each LC cell from the array 110.1 of LC cells, starting from the LC cell to which the photodetector with the smallest SDS distance ($SDS_1$ in FIG. 1) corresponds, and continuing until the LC cell, to which the photodetector with the largest SDS distance ($SDS_N$ in FIG. 1) corresponds, is opened. In an alternative embodiment of the present disclosure, the opening direction of the LC cells may begin from the farthest LC cell with the largest SDS distance ($SDS_N$ in FIG. 1) and continue toward the LC cell with the smallest SDS distance ($SDS_1$ in FIG. 1). In an alternative embodiment, sequential opening may include opening all even numbered LC cells, and then all odd numbered LC cells. Those skilled in the art will understand other variants of sequential opening, which comply with the condition that LC cells neighboring to the LC cell being opened are closed. Sequentially opening of each LC cell and receiving only the radiation that has passed through it and the corresponding focusing lens, eliminates crosstalk between photodetectors. In other words, this sequence of actions avoids (or reduces) the situation in which radiation from one zone on the turbid medium 20 surface in the radiation receiving area 15 is simultaneously detected by two or more adjacent photodetectors.

To open the corresponding LC cell, the processor 120 is configured to apply a control voltage to the corresponding LC cell. It should be understood that according to the present disclosure, only one LC cell is opened at a certain moment of time, and at the next moment of time, the opened LC cell is closed and the next LC cell from the array of LC cells is opened, etc. If necessary, several measurements can be made with each LC cell, and there can be several measurement cycles from the first LC cell in the array to the last LC cell in the array 110.1. The opening of a LC cell is such a state in which radiation can pass through it. Initially, the LC cell is closed, and does not pass radiation. To receive radiation by a photodetector, the processor 120 is configured to provide a control signal to the photodetector array 110.3 to induce the corresponding photodetector or the entire array 110.3 of photodetectors to receive radiation. To sequentially open each LC cell from the array 110.1 of LC cells with the simultaneous reception of radiation, the processor 120 synchronizes the moment of application of the control voltage to the corresponding LC cell with the moment the control signal is provided to the corresponding photodetector or the array 110.3 of photodetectors. Thus, at the initial moment ($t_1$) of the operating time, which is illustrated in FIGS. 1 and 2, the optical receiver 110 obtains a radiation intensity value in a sub-area of the radiation receiving area 15 to which the distance $SDS_1$ corresponds (by means of first elements of the optical receiver 110 that correspond to the distance $SDS_1$). At a subsequent moment ($t_2$) of the operating time, which is illustrated in FIG. 3, the optical receiver 110 obtains a radiation intensity value in a sub-area of the radiation receiving area 15 to which the distance $SDS_2$ corresponds (by means of second elements of the optical receiver 110 that correspond to the distance $SDS_2$), etc.

Figure 3:
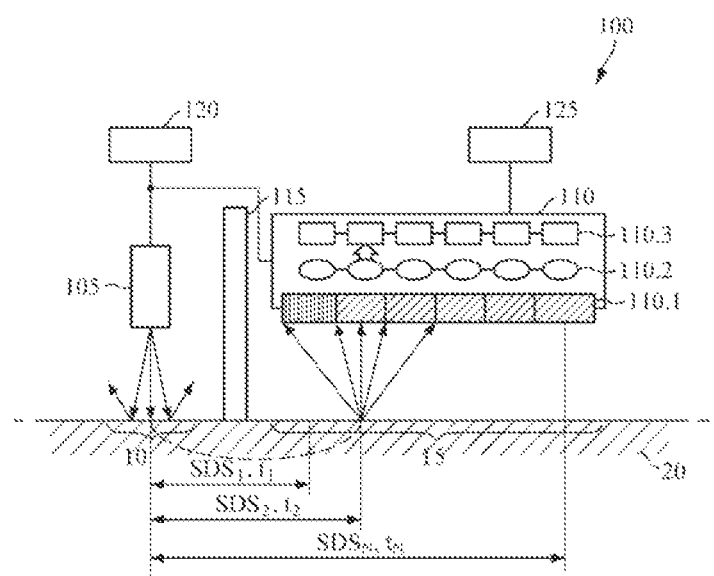
FIG. 3 illustrates a side view of the embodiment of the system 100 for extraction of optical properties of the turbid medium 20 by using diffuse reflectometry at a subsequent moment $t_2$ of operation time.

The system 100 for extraction of optical properties of the turbid medium 20 by using diffuse reflectometry illustrated in FIGS. 1-3 comprises a processor 125 configured to extract optical properties of the turbid medium 20 basing on the distribution of radiation intensity. In an embodiment, to extract optical properties of the turbid medium 20, the processor 125 is configured to compare the measured radiation intensity values from the radiation intensity distribution obtained for the turbid medium 20 with a corresponding set of possible radiation intensity values for a given type of turbid medium 20 from a plurality of sets of possible values of radiation intensity, previously simulated by the Monte Carlo method for various optical properties of turbid media of various types, to find a subset of radiation intensity values that minimizes the error E:

$$E = \frac{1}{S} \sum_i \left[ \frac{R_{i,meas} - R_{i,model}}{R_{i,meas}} \right]^2$$

As shown above, S is the number of photodetectors, i=1 . . . S is a photodetector number, $R_{i,meas}$ is the measured value of the radiation intensity for the photodetector i; and $R_{i,model}$ is the simulated value of the radiation intensity for the photodetector i;

The found subset of values that minimizes the error E indicates specific optical properties (absorption coefficient and scattering coefficient) of the turbid medium 20. A certain type (for example, skin, air, etc.) of the turbid medium 20, according to which measurements will be made, may be indicated by a predetermined value (for example, value "1" corresponds to the skin, value "2" corresponds to exhaled air) of a type of turbid medium 20 parameter, which can be received by an input interface, which for these purposes can be included in the system 100. In another embodiment, in which the system 100 is always used only for a certain type of the measured turbid medium 20, for example skin, the system 100 does not need to receive an input of the type of the measured turbid medium 20 each time, since this type will not change from measurement to measurement. In this other embodiment, the processor 125 can be preconfigured with the required set of possible values of the radiation intensity for a certain type of turbid medium 20, which is always used by the system 100 for extraction of optical properties of turbid medium 20. For these purposes, the processor 125 may have a data storage function for storing an appropriate set of possible radiation intensity values for a particular type of turbid medium 20; or the system 100 or another device (an example of such a device will be described in more detail below), into which such a system 100 can be included, may further comprise a memory configured to store a corresponding set of possible values of radiation intensity for a certain type of turbid medium 20, as well as any other data, for example, computer-readable instructions for the system 100 to execute the extraction of optical properties of turbid medium 20 by using of diffuse reflectometry, which permit the system 100 to function.

The following are additional explanations for Monte Carlo modeling of the sets of possible values of radiation intensity for a certain type of turbid medium 20. The Monte Carlo simulation in this application is used to solve the problem of direct numerical simulation of radiation propagation in a specific turbid medium. The Monte Carlo simulation according to the present disclosure includes an operation in which ray tracing is performed. Ray tracing can be carried out using special software (for example, LightTools), or using Monte Carlo simulation code with ray tracing and recorded in any suitable programming language, for example, programming language C. As an example, the Monte-Carlo simulation can use a two-layer model of turbid medium 20 with 4 free parameters: the thickness of the upper layer z0, the absorption coefficient of the upper layer μa, t, the absorption coefficient of the lower layer μa, b, the scattering coefficient μs, which is considered equal for the upper and lower layers.

Optionally, the array 110.2 of microlenses is an array of LC microlenses configured to change the focal length under the control of the processor 120 depending on the applied control voltage. In this way, it is possible to change the magnification of the system during measurement. In addition, the system 100 may further comprise a mirror-lens system on the side of at least one light source 105, configured to form a parallel or converging light beam incident on the turbid medium 20 surface that is normal to the surface or oblique with respect to the surface, using one or more lenses and/or one or more mirrors. The mirror-lens system can be projected and designed in such a way that an illumination area (spot) of a particular size is formed on the turbid medium 20 surface. As the size of the backlight area decreases, the accuracy of optical properties extraction (i.e., measurements) increases. The specific size of the illumination area can be empirically selected by taking into account the structural features of the system 100 according to the general rule that the smaller the illumination area, the greater the accuracy of optical properties extraction. By controlling the angle of incidence of radiation on the turbid medium 20 surface (at the step of designing the mirror-lens system), it is possible to: (i) obtain the minimum SDS, i.e., bring the illumination area as close to the separator 115 as possible due to the beam tilt (and thereby increase the radiation power detected on photodetectors), (ii) change the length of radiation path in the turbid medium 20.

In another embodiment, the optical receiver 110 is mounted in a frame capable of moving substantially along the turbid medium 20 surface to allow radiation to be received by the optical receiver 110 with different SDS distances. In this way, the optical receiver 110, comprising, in an alternative embodiment, a group of single LC cells, single microlenses, and single photodetectors arranged one above the other (similar to combining such elements in FIG. 1) will still be configured to obtain the distribution of radiation intensity in the radiation receiving area 15 by sequentially detecting the radiation intensities when the optical receiver 110 is moving at various SDS distances ($SDS_1$-$SDS_N$). The movement can be implemented by, for example, a step electric drive, a piezoelectric micromotor, or the like.

In an additional embodiment, the optical receiver 110 in the system 100 further comprises an additional array of microlenses aligned with the array 110.1 of LC cells, the array 110.2 of microlenses, and the array 110.3 of photodetectors, wherein one of the additional array of microlenses and the array 110.2 of microlenses mounted in the frame with the ability of moving essentially perpendicular to the turbid medium 20 surface relative to the stationary other one from the additional array of microlenses and the array of microlenses. The movement can be implemented by, for example, a step electric drive, a piezoelectric micromotor. Due to this feature, the magnification of the optical receiver 110 can be variable, and depending on the desired task, one can investigate a larger or smaller volume of the turbid medium 20.

The system 100 may comprise optical fiber coupled to at least one light source 105, and configured to transmit radiation from the at least one light source 105 to the turbid medium 20 in the radiation input area 10. The use of optical fiber on the side of the light source 105 allows flexible installation and free orientation of the at least one light source 105 and any other components of the mirror-lens system to miniaturize the size of the final system 100 or device into which such system 100 can be installed. When using the optical fiber on the side of at least one light source 105, the system 100 may further comprise a reference channel configured to divert part of the radiation emitted by the at least one light source 105 to a reference receiver configured to measure a change in power (e.g., due to heating) of the at least one light source 105 based on the intensity of the diverted radiation, and report the measured change in power to the processor 125 to account for this change in extraction of optical properties of the turbid medium 20 based on the distribution of radiation intensity. The diversion of part of the radiation from the optical fiber into the reference channel can be provided by a beam splitter. Due to this allowance for changes in the power of the light source 105 over time, the accuracy of extraction of optical properties of the turbid medium 20 does not tend to gradually deteriorate.

The optical receiver 110 has a housing, wherein, optionally, at least one separator 115 is at least a portion of the housing of the optical receiver 110. In addition, at least a portion of the housing of the optical receiver 110 can be provided with a mirror surface and with such a tilt and/or a form which is/are configured to redirect the incident or output radiation, for example, from optical fiber, to the radiation input area 10 on the turbid medium 20 surface. Using the above features in the practical implementation of the present disclosure allows miniaturization of the size of the final system 100 or a device into which such a system 100 can be installed.

In an additional embodiment, the at least one separator 115 seals the periphery of the optical receiver 110 and protrudes with the side open to receive radiation toward the radiation receiving area 15 on the turbid medium 20 surface. The protruding part of the separator 115 may be covered by a transparent element, for example, glass, to form a sealed chamber (not shown) that can be filled with immersion fluid. The formation of a sealed chamber with immersion fluid in the path of the radiation detected in the radiation receiving area 15 by the optical receiver 110 allows increasing the numerical aperture of the receiving optical system, and in this case, the receiving optical system will collect more light on the photodetectors, in other words, the radiation power at the photodetectors will be higher.

One skilled in the art will appreciate that the system 100 may further comprise a power supply configured to supply power to the at least one light source 105, the optical receiver 110, the processor 120, and to the processor 125. In addition, it should be understood that the power supply, the at least one light source 105, the optical receiver 110, the at least one separator 115, the processor 120, and the processor 125 are at least partially located in the housing, which may be a wearable device housing.

Figure 4:
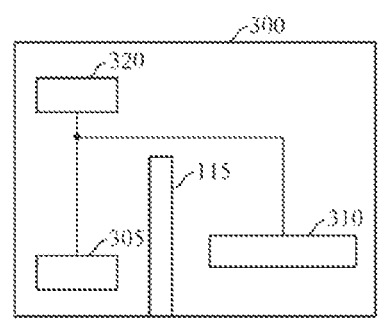
FIG. 4 illustrates an embodiment of a user computing device 300 for extraction of optical properties of the turbid medium 20.

In a second aspect of the present disclosure, there is provided a user computing device 300 for extraction of optical properties of a turbid medium 20. The computing device 300 is shown schematically in FIG. 4. The user computing device 300 comprises, at least partially installed in the housing of the user computing device 300, at least one light source 305 configured to provide radiation to the turbid medium 20 in the radiation input area 10; an optical receiver 310 configured to receive radiation passed through the turbid medium 20 in the radiation receiving area 15 to obtain distribution of radiation intensity, at least one separator 315 configured to separate the radiation input area 10 from the radiation receiving area 15, and configured to prevent the radiation, partially reflected from the turbid medium 20 surface in the radiation input area 10, from entering the radiation receiving area 15 of the optical receiving system 310; and a processor 320.

The optical receiver 310 comprises an array 310.1 of LC cells, an array 310.2 of microlenses, and an array 310.3 of photodetectors, which are aligned so that each LC cell from the array 310.1 of LC cells corresponds to a corresponding microlens from the array 310.2 of microlenses and to a corresponding photodetector from the array 310.3 of photodetectors. The optical receiver 310 may be similar to the optical receiver 110 illustrated and described with reference to FIGS. 1-3. It should be understood that the specific configuration and orientation (relative to the light sources 105 and 305) of both the optical receiver 110 and the optical receiver 310 can be any one, but not beyond the scope of the description above. As an example, the number of elements in each of the arrays contained in the optical receiving systems 110 and 310 may be any adequate number, starting from 1 (in the embodiment, the optical receiver 110, which is configured to move along the air/turbid medium 20 interface) and more (6 in each of the arrays in FIGS. 1-3). In addition, it should be understood that both in the first aspect (system 100) of the present disclosure and in the second aspect (device 300) of the present disclosure, the periphery of the optical receiver 110, 310 can be surrounded by a separator and several light sources can be installed from opposite sides to increase the power of the signal at the photodetectors. Any other features described above with reference to the system 100 according to the first aspect of the present disclosure are also applicable to the user computing device 300 according to the second aspect of the present disclosure.

The processor 320 of the user computing device 300 is configured to control the optical receiving system 310, while the radiation is provided to the turbid medium 20 in the radiation input area 10, to induce the optical receiver 310 to sequentially open each LC cell from the array 310.1 of LC cells and simultaneously detect the radiation, passed through the corresponding opened LC cell, by the corresponding photodetector from the array 310.3 of photodetectors to obtain said distribution of radiation intensity and extract optical properties of turbid medium 20 basing on the obtained distribution of radiation intensity. The processor 320 of the user computing device 300 according to the second aspect of the present disclosure may implement the functionality of the processor 120 and the processor 125 from the first aspect of the present disclosure. Any of the processor 320, the processor 120, and the processor 125 can be implemented as a Single-Level Cell (SLC), a solid-state circuit (SSC), a field programmable gate array (FPGA), an application-specific integrated circuit (ASIC), a central processing unit (CPU), a graphics processing unit (GPU), an accelerated processing unit (APU), a microprocessor, a microcontroller, a digital signal processor (DSP), etc. The processor 120 and the processor 125 may be integrated as a single processor in some embodiments. The user computing device 300 can be, but without limitation, any one of a smartphone, tablet, smart watch, smart bracelet, etc.

Figure 5:
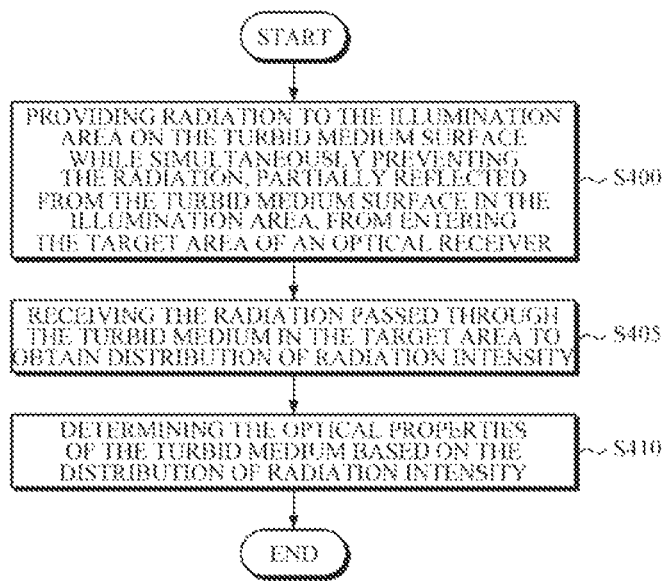
FIG. 5 illustrates an embodiment of a method for extraction of optical properties of the turbid medium 20.

In a third aspect of the present disclosure, there is provided a method for extraction of optical properties of a turbid medium 20 illustrated in FIG. 5. The method comprises the operations of: providing (operation S400) radiation into the illumination area on the turbid medium 20 surface while simultaneously preventing the radiation, partially reflected from the turbid medium 20 surface in the illumination area, from entering (by using a separator of the illumination area and the target area) the target area of an optical receiver containing an array of LC cells, an array of microlenses, and an array of photodetectors, which are aligned so that each LC cell from the array of LC cells corresponds to a corresponding microlens from the array of microlenses and a corresponding photodetector from the array of photodetectors; receiving (operation S405), by the optical receiver, the radiation passed through the turbid medium 20 in the target area to obtain a distribution of radiation intensity; and determining (operation S410) the optical properties of the turbid medium 20 based on the distribution of radiation intensity.

Figure 6:
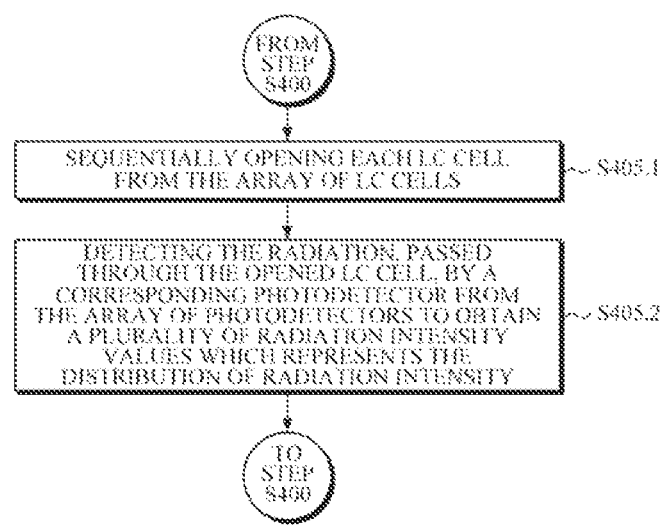
FIG. 6 illustrates the sub-operations of the operation of receiving S405 radiation passed through the turbid medium 20 in the target area to obtain a distribution of radiation intensity according to the embodiment of the method for extraction of optical properties of turbid medium 20 shown in FIG. 5.

The operation of receiving (operation S405) the radiation includes sub-operations shown in FIG. 6 which comprise, along with providing (operation S400) the radiation in the illumination area on the turbid medium 20 surface: sequentially opening (operation S405.1) (e.g., one after another, one or more, etc.) each LC cell from the array of LC cells, and detecting (operation S405.2) the radiation, passed through the opened LC cell, by a corresponding photodetector from the array of photodetectors to obtain a plurality of radiation intensity values which represents the distribution of radiation intensity.

According to another aspect, a non-transitory computer-readable medium may be provided, comprising computer-executable instructions for implementing the operations and sub-operations of the method for extraction of optical properties of the turbid medium 20 by means of at least a light source, a processor, and an optical receiver.

Mentioning any element of this description in the singular does not exclude its possible plurality in actual implementation. Usage of the terms "first," "second," etc. should not be interpreted as indicating any priority or preferred order of any of the elements described in this description using such terms. Instead, these terms are used only to distinguish between one or more elements of the same type and, therefore, simplify their description. The use of the terms "comprises" and "includes" throughout this description means an open list. The term "array" is used in this description to indicate a plurality of elements of the same type, while the term itself does not imply that such elements are originally assembled as a single component-array, instead, the term "array" can mean many elements of the same type (e.g., LC cells, microlenses, photodetectors, etc.) produced as separate elements that are evenly distributed over a certain area and are fixed relative to each other by any means such as, for example, a fastener, glue, a common substrate, etc.

The example embodiments disclosed in this application can be used as part of a sensor for non-invasive medical monitoring of various vital signs such as, for example, blood glucose, oxygenation, changes in the microstructure of the tissue (associated, for example, with intraepithelial neoplasia), or the like. Such use may take place in a medical facility or at home. In addition, the sensor for non-invasive medical control using the example embodiments disclosed in this application can be used as a wearable device.

The example embodiments disclosed in this application can be used as part of a medical gas analyzer for determining the concentration of oxygen in exhaled air. Since there is a correlation between oxygen consumption in the lungs and metabolic rate, it is possible to determine: VO2 max for sports medicine, calorie consumption, body response to treatment, hypoxia, etc. The example embodiments disclosed in this application can also be used to control air quality to determine the presence of harmful substances, particles, etc. in the air. In addition, the exampled embodiments disclosed in this application can also be used to control the quality of products for determining the freshness of fruits, vegetables, dairy products; determine the concentration of harmful additives in products; control over milk fermentation during milk processing into such various products as cheese, cream, yogurt, etc.

The example embodiments disclosed in this application can also be used in pharmaceuticals, including for determining the characteristics of the original material, controlling the process of obtaining powder, controlling the granulation process, monitoring the process of production of tablets, and characterizing the final products. The example embodiments disclosed in this application can be used to determine the characteristics (the degree of destruction and inclusions) of wooden archaeological finds without causing their destruction.

Having read this description, those skilled in the art may appreciate other embodiments of the present disclosure, modifications, equivalent features and details. It is assumed that all such other embodiments of the present disclosure, modifications, equivalent features and details are covered by the following claims.

The invention claimed is:

1. A system for extraction of optical properties of a turbid medium by using diffuse reflectometry, the system comprising:
at least one light source configured to provide radiation to the turbid medium in a radiation input area of the at least one light source;
an optical receiver configured to receive radiation, passed through the turbid medium, in a radiation receiving area of the optical receiver, and obtain a distribution of radiation intensity, wherein the optical receiver comprises an array of liquid crystal (LC) cells, an array of microlenses, and an array of photodetectors which are aligned so that each LC cell from the array of LC cells corresponds to a corresponding microlens from the array of microlenses and to a corresponding photodetector from the array of photodetectors;
at least one separator configured to separate the radiation input area of the at least one light source from the radiation receiving area of the optical receiver, and prevent radiation, partially reflected from a surface of the turbid medium in the radiation input area of the at least one light source, from entering the radiation receiving area of the optical receiver; and
at least one processor configured to:
control the optical receiver, while the radiation is provided to the turbid medium in the radiation input area of the at least one light source, to sequentially open each LC cell from the array of LC cells, and simultaneously receive radiation, passed through the sequentially opened LC cells and corresponding microlenses, by corresponding photodetectors from the array of photodetectors to obtain the distribution of radiation intensity; and
extract the optical properties of the turbid medium based on the distribution of radiation intensity.

2. The system of claim 1, wherein the array of LC cells, the array of microlenses, and the array of photodetectors are aligned with each other in an order corresponding to respective positions of the array of LC cells, the array of microlenses, and the array of photodetectors with respect to the turbid medium.

3. The system of claim 1, wherein the array of LC cells comprises two or more LC cells arranged in at least one row,
wherein the array of microlenses comprises two or more microlens arranged in at least one row, and
wherein the array of photodetectors comprises two or more photodetectors arranged in at least one row.

4. The system of claim 3, wherein the optical receiver is positioned relative to the at least one light source and the at least one separator so that a source-detector separation (SDS) distance is increased between the at least one light source and each subsequent photodetector in the at least one row of photodetectors, and
wherein the at least one processor is configured to control the optical receiver to sequentially open each LC cell from the array of LC cells starting from an LC cell corresponding to a photodetector having the smallest SDS distance, and continue until an LC cell corresponding to a photodetector having the largest SDS distance is opened.

5. The system of claim 1, wherein to extract the optical properties of the turbid medium, the at least one processor is configured to compare measured radiation intensity values, from the radiation intensity distribution obtained for the turbid medium, with a corresponding set of possible radiation intensity values fora given type of turbid medium from a plurality of sets of possible values of radiation intensity, previously simulated by the Monte Carlo method for various optical properties of turbid media of various types, and find a subset of radiation intensity values that minimizes an error E:

$$E = \frac{1}{S}\sum_{i}\left[\frac{R_{i,meas} - R_{i,model}}{R_{i,meas}}\right]^2$$

wherein S is a number of photodetectors,
wherein i is a photodetector number,
wherein $R_{i,meas}$ is a measured value of a radiation intensity for a photodetector i,
wherein $R_{i,model}$ is a simulated value of the radiation intensity for the photodetector i,
wherein the subset of values that minimizes the error E indicates specific optical properties of the turbid medium, and
wherein the specific optical properties are an absorption coefficient and a scattering coefficient of the turbid medium.

6. The system of claim 1, wherein the array of microlenses is an array of LC microlenses configured to change a focal length based on an applied control voltage of the at least one processor.

7. The system of claim 1, further comprising:
a mirror-lens system provided on a side of the at least one separator corresponding to the at least one light source, and configured to form a parallel or converging light beam incident on the turbid medium surface in a normal or oblique direction, using one or more lenses and one or more mirrors or using one or more lenses or one or more mirrors.

8. The system of claim 1, wherein the optical receiver is mounted in a frame configured to move along the surface of the turbid medium to allow radiation to be received by the optical receiver with different SDS distances.

9. The system of claim 1, wherein the optical receiver further comprises an additional array of microlenses aligned with the array of LC cells, the array of microlenses, and the array of photodetectors, and
wherein one of the additional array of microlenses and the array of microlenses mounted in the frame is configured to substantially perpendicular to the surface of the turbid medium relative to a stationary other one of the additional array of microlenses and the array of microlenses to vary a resolution provided by the optical receiver.

10. The system of claim 1, further comprising:
optical fiber coupled to the at least one light source, and configured to transmit radiation from the at least one light source to the turbid medium in the radiation input area of the at least one light source.

11. The system of claim 10, further comprising:
a reference channel configured to divert a part of the radiation emitted by the at least one light source to a reference receiver configured to measure a change in power of the at least one light source based on an intensity of the diverted part of the radiation, and report the measured change in power to the at least one processor to account for a change in extraction of the optical properties of the turbid medium based on the distribution of radiation intensity.

12. The system of claim 11, wherein the diversion of the part of the radiation from the optical fiber into the reference channel is provided by a beam splitter.

13. The system of claim 1, wherein the optical receiver is enclosed in a housing, and
wherein the at least one separator is the housing of the optical receiving system.

14. The system of claim 13, wherein at least a portion of the housing is a mirror configured to redirect incident radiation to the radiation input area of the at least one light source on the surface of the turbid medium, and
wherein the system further comprises optical fiber coupled to the at least one light source, and configured to transmit radiation from the at least one light source to the portion of the housing of the optical receiver.

15. The system of claim 1, wherein to open an LC cell, the at least one processor is configured to apply a corresponding control voltage to the LC cell.

16. The system of claim 1, wherein the at least one light source is a coherent light source.

17. The system of claim 1, wherein the at least one separator is a wall sealing a periphery of the optical receiver, and protrudes from the optical receiver toward the turbid medium, and
wherein a portion of the wall that protrudes from the optical receiver is covered by a transparent element to form a sealed chamber filled with immersion fluid.

18. The system of claim 1, wherein the at least one light source and the optical receiver are arranged relative to each other so that the radiation input area of the at least one light source and the radiation receiving area of the optical receiver do not overlap.

19. The system of claim 1, further comprising:
a power supply configured to supply power to the at least one light source, the optical receiver, and the at least one processor.

20. The system of claim 19, wherein the power supply, the at least one light source, the optical receiver, the at least one separator, and the at least one processor are at least partially provided in a housing.

21. The system of claim 20, wherein the housing is a wearable device housing.

22. A user computing device for extraction of optical properties of a turbid medium, the user computing device comprising:
at least one light source configured to provide radiation to the turbid medium in a radiation input area of the at least one light source;
an optical receiver configured to receive radiation, passed through the turbid medium, in a radiation receiving area of the optical receiver to obtain a distribution of radiation intensity, wherein the optical receiver comprises an array of liquid crystal (LC) cells, an array of microlenses, and an array of photodetectors which are aligned so that each LC cell from the array of LC cells corresponds to a corresponding microlens from the array of microlenses and to a corresponding photodetector from the array of photodetectors;
at least one separator configured to separate the radiation input area of the at least one light source from the radiation receiving area of the optical receiver, and configured to prevent radiation, partially reflected from a surface of the turbid medium in the radiation input area of the at least one light source, from entering the radiation receiving area of the optical receiver; and a processor configured to:
- control the optical receiver, while the radiation is provided to the turbid medium in the radiation input area of the at least one light source, to sequentially open each LC cell from the array of LC cells, and simultaneously detect radiation, passed through the sequentially opened LC cells, by corresponding photodetectors from the array of photodetectors to obtain the distribution of radiation intensity; and
- extract the optical properties of the turbid medium based on the obtained distribution of radiation intensity.

23. The user computing device according to claim 22, wherein the user computing device is a smartphone, a tablet, a smart watch, or a smart bracelet.

* * * * *